March 8, 1966 W. M. HALLIDY 3,239,746
GENERATING SYSTEM REGULATION
Original Filed Oct. 30, 1957

INVENTOR.
WILLIAM M. HALLIDY
BY Williams, David,
Hoffmann & Yount.
ATTORNEYS

United States Patent Office 3,239,746
Patented Mar. 8, 1966

3,239,746
GENERATING SYSTEM REGULATION
William M. Hallidy, Glendora, Calif., assignor to The Leece-Neville Company, Cleveland, Ohio, a corporation of Ohio
Original application Oct. 30, 1957, Ser. No. 693,320, now Patent No. 3,082,370, dated Mar. 19, 1963. Divided and this application Apr. 17, 1962, Ser. No. 188,054
13 Claims. (Cl. 322—25)

This application is a division of application Serial No. 693,320, filed October 30, 1957, now U.S. Patent No. 3,082,370.

This invention relates to voltage and current regulating apparatus and to electrical systems embodying such regulating apparatus.

An object of this invention is to provide novel transistorized regulating apparatus for controlling voltage and current values, and a novel alternating current system employing such transistorized regulating apparatus.

Another object is to provide a novel regulating apparatus and an alternating current generating system employing transistor means in combination with a low-cost electromagnetic relay means, such that the transistor means provides a desirable long-life form of variable impedance and such that the contacts of the relay means handle only the input signal to the transistor means and will accordingly have a long contact life.

It is also an object of this invention to provide novel regulator means for use with an alternating current supply means and comprising transistor means connected with the current supply means as a sensing means through a pair of rectifiers and a center-tapped resistor, such that the output signal of the sensing means will always be a low-voltage direct current signal.

Additionally this invention provides novel regulating means for application to an alternating current generating system, in which the field excitation for the generator means is controlled by a first transistor means in response to an input signal supplied to the latter through the contacts of a relay means, and in which the coil current of the relay means is supplied thereto by a sensing means comprising an amplifying transistor means connected with the alternating current system through rectifier cells and center-tapped resistor means.

Figure 1:
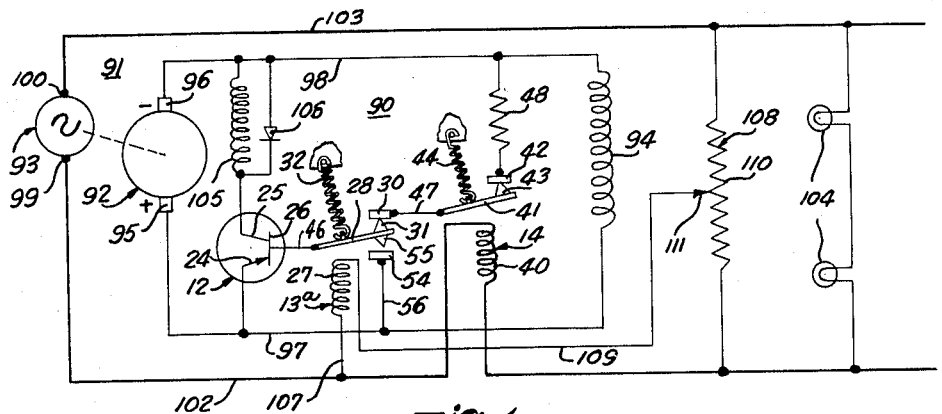
Figure 2:
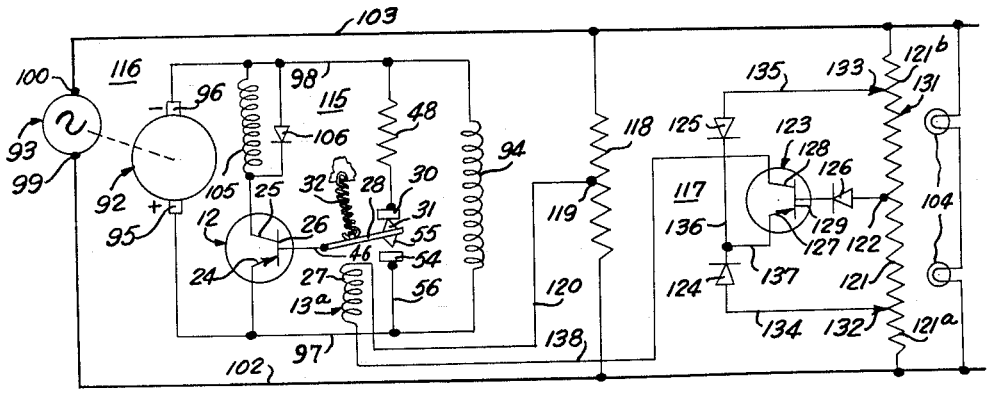
Figure 3:
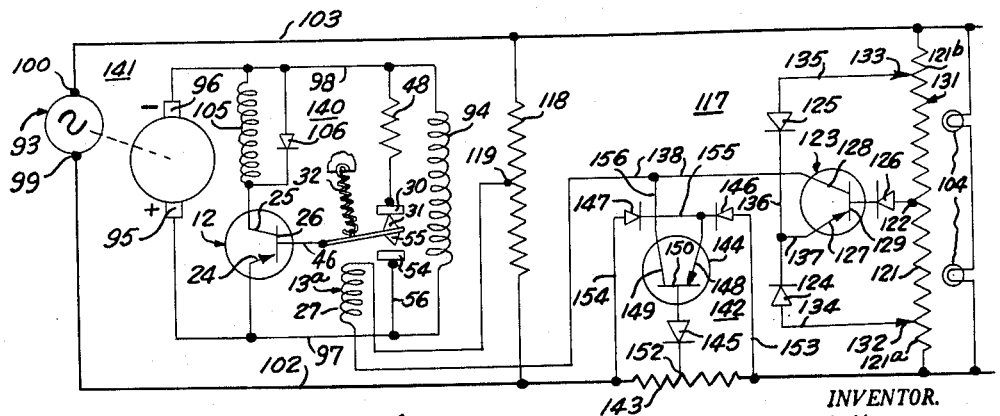

Other objects and advantages of this invention will be apparent in the following detailed description and in the accompanying drawings forming a part of this specification and in which, FIGS. 1, 2 and 3 are wiring diagrams showing alternating current systems embodying the regulating means of this invention.

As representing one of the preferred embodiments of the present invention, FIG. 1 of the drawings shows transistorized regulating means 90 applied to an alternating current system, in this case, an alternating current generating system 91. The regulating means 90 comprises in general a transistor 12, a voltage relay 13ᵃ and a load limiter or current relay 14. The generating system 91 includes a direct current supply means for field excitation purposes, in this case, an exciter generator 92 having positive and negative output terminals 95 and 96.

The alternating current generating system 91 comprises an alternator 93 having a field winding 94 to which the output terminals 95 and 96 of the exciter generator 92 are connected by conductors 97 and 98. The alternator 93 has load terminals 99 and 100 to which a pair of load conductors 102 and 103 are connected respectively for supplying current to an external load such as to lamps 104. The exciter generator 92 includes a conventional shunt field winding 105 on which the regulating means 90 is effective in the manner explained hereinafter.

The transistor 12 is a conventional form of transistor having emitter and collector electrodes 24 and 25 and a base electrode 26. The transistor 12 is located in the field circuit of the exciter generator 92 with its emitter and collector electrodes 24 and 25 connected in series with the field winding 105. The transistor 12 can be either a PNP or an NPN transistor depending upon the polarity of the circuit connections employed but, as here shown, is a PNP transistor having its emitter electrode 24 connected with the positive terminal 95 of the exciter generator 92 through a portion of the conductor 97.

The voltage relay 13ᵃ is of a conventional form comprising an energizing magnet coil 27 mounted on a suitable frame (not shown), and a movable armature 28 which is responsive to the energization of the magnet coil. The voltage relay 13ᵃ also comprises a pair of stationary and movable contacts 30 and 31, of which the movable contact 31 is carried by the armature 28 and is biased toward engagement with the stationary contact 30 by a tension spring 32 connected with the armature.

The magnet coil 27 of the voltage relay 13ᵃ is connected across the load terminals 99 and 100 of the alternator 93 through the load conductors 102 and 103, so as to be responsive to variations in the output voltage of the alternator. For this purpose, one end of the magnet coil 27 is connected with the load conductor 102 by a conductor 107 and the other end of this coil is connected to the load conductor 103 through a resistance device or voltage divider 108 which is preferably of the potentiometer type. The resistance device 108 comprises a resistor 110 connected across the load terminals 99 and 100, and a shiftable contact 111 movable along the resistor 110 and having said other end of the magnet coil 27 connected therewith by the conductor 109.

The load limiter or current relay 14 is of a conventional form comprising an energizing magnet coil 40 mounted on a suitable magnet frame (not shown) and a movable armature 41 which is responsive to the energization of the magnet coil 40. The current relay 14 also comprises co-operating stationary and movable contacts 42 and 43, of which the latter contact is carried by the armature 41 and is biased toward engagement with the stationary contact 42 by a tension spring 44 connected to the armature. The energizing coil 40 of the current relay 14 is a series coil located in the load conductor 102, such that the energization of this coil will be responsive to changes in the current values of the load current being delivered by the alternator 93.

The regulating apparatus 90 also comprises a signal or control circuit means through which a signal or control potential is supplied to the base 26 of the transistor 12 and is controlled by the co-operating contacts of the voltage and current relays 13ᵃ and 14. This control circuit means is here shown as comprising a conductor 46 connecting the voltage relay armature 28 with the base 26 of the transistor 12, a conductor 47 connecting the armature 41 of the current relay 14 with the stationary contact 30 of the voltage relay, and a resistor 48 connected between the stationary contact 42 of the current relay and the field circuit conductor 98.

The voltage and current relays 13ᵃ and 14 are of the vibratory type and, from the construction and circuit connections above described for the regulating means 90, it will be seen that the voltage relay will be responsive to variations in the output voltage of the alternator 93 and the current relay will be responsive to variations in the load current being delivered by the alternator. It will be seen further that the signal current, being supplied to the base 26 of the transistor 12 through the above-mentioned control circuit, passes through the voltage and current relay contacts 30, 31 and 42, 43. Consequently, whenever either pair of these contacts is open in response to an increase occurring in the voltage or current value of the alternator output, the control circuit will be opened to interrupt the supply of signal current to the base of the transistor.

The transistor 12 will accordingly serve as a variable impedance in the field circuit of the exciter generator 92, and will also function as a true switching device inasmuch as the circuit to the transistor base 26 is either open or closed depending upon the condition of the contacts of the voltage and current relays 13ª and 14. When the voltage and current values of the output of the alternator 93 are low, both pairs of regulator contacts will be closed by the influence of the springs 32 and 44 whereupon signal current will be supplied to the transistor base 26 causing the transistor to conduct. Thereupon a full value of field energizing current will flow through the emitter and collector electrodes 24 and 25 and through the field winding 105 of the exciter 92. In response to a resulting build-up of the voltage and current values of the alternator output, one or both of the pairs of contacts 30, 31 and 42, 43 of the voltage and current relays 13ª and 14 will be opened to thereby interrupt the signal current supply to the transistor base 26, whereupon the transistor will be in a nonconducting or off condition and the energizing current flowing through the field winding 105 will be of a minimum or zero value.

The resistor 48 of the above-mentioned control circuit is selected of a suitable resistance value such that when the transistor 12 is in an on or conducting condition, the current flow through the emitter and collector electrodes 24 and 25 thereof will be limited to a safe value for the transistor but will still provide full excitation for the field winding 105.

The regulating means 90 preferably also includes a suitable diode 106 connected in a shunt relation to the field winding 105 of the exciter 92 for protecting the transistor 12 by dissipating the induced potential or so-called inductive "kick" of this field winding.

From the construction and the circuit connections just above described for the regulating means 90 and the alternating current generating system 91, it will be seen that the regulating means will be directly responsive to voltage and current fluctuations in the alternating current output of the system 91 such that the transistor 12 will control the excitation of the field winding 105 of the exciter 92, with the result that the output of the exciter will correspondingly vary the excitation of the field winding 94 of the alternator 93 and produce a controlled effect on the voltage and current values of the alternator output being supplied to the load circuit 102, 103.

FIG. 2 of the drawings shows transistorized regulating means 115 which in certain respects, is similar to the above-described regulating means 90 and which is applied to an alternating current generating system of substantially the same form as the above-described alternating current generating system 91 of FIG. 1. The components of the regulating means 115 and of the generating system 116, which correspond with those of the regulating means 90 and the generating system 91, have been designated by the same reference characters. The regulating means 115 of FIG. 2 differs from the regulating means 90 in that the load limiter or current relay 14 has been omitted, and in the use of a different form of voltage sensing device 117.

The voltage sensing device 117 includes a first center-tapped resistor 118 connected across the load conductors 102 and 103 and having a center tap 119 to which one end of the voltage relay magnet coil 27 is connected by a conductor 120. The voltage sensing device 117 also includes a second center tapped resistor 121 connected across the load conductors 102 and 103 and having a center tap 122. Additionally the voltage sensing device 117 comprises a transistor 123, a pair of diodes used as rectifiers 124 and 125, and a diode 126 of the Zener type and having a relatively low breakdown voltage.

The transistor 123 is of a conventional form having emitter and collector electrodes 127 and 128 and a base electrode 129. The transistor 123 functions as both a switching transistor and an amplifying transistor. The base 129 of the transistor is connected with the center tap 122 of the resistance device 121 through the diode 126. The center tapped resistor 121 forms a part of a variable resistance device 131 which also includes adjustable contacts 132 and 133 shiftable along end portions or resistance sections 121ª and 121ᵇ of the resistor 121.

The diodes 124 and 125 are half-wave rectifiers which are connected respectively with the contacts 132 and 133 by conductors 134 and 135 and are also connected with each other by a junction conductor 136. The emitter electrode 127 of the transistor 123 is connected with the rectifiers 124 and 125 at a point therebetween by a conductor 137. The collector electrode 128 of the transistor 123 is connected with the other end of the voltage relay coil 27 through a conductor 138.

From the construction and circuit connections of the voltage sensing device 117 as above described, it will be seen that the voltage relay 13ª will be responsive to relatively low-value voltage fluctuations occurring in the output of the alternator 93 and that the voltage sensing means itself will be subjected to only relatively low voltage values by reason of the use of the center-tapped resistors 118 and 121 for connecting this sensing means in circuit with the alternator. It will also be seen that, by reason of the use of the pair of rectifiers 124 and 125, the alternating current signals supplied to the sensing device 117 by the load conductors 102 and 103 will be rectified with respect to both half-wave portions of the alternating current output, such that the energizing current supplied to the voltage relay coil 27 by the sensing means will be a full-wave rectified D.C. current.

Moreover, it will be seen that by use of the adjustable contacts 132 and 133 of the resistance device 131 as the circuit connections to the pair of rectifiers 124 and 125, the voltage of the rectified current being supplied to the voltage relay coil 27 can be maintained at a suitably low value which will be a safe value for the transistor 123 and will permit the latter to be of a small and inexpensive size. Additionally it will be seen that by using as the diode 126 a conventional Zener diode having a low breakdown voltage, the transistor 123 will be responsive to low voltage fluctuations in the output of the alternator 93 and will be switched to an on or conducting condition in response to signals of a relatively low voltage value. It will be seen further that the voltage relay coil 27 will be energized only when the transistor 123 is in its on condition and that when this transistor is switched to its off condition, the voltage relay coil will be substantially de-energized.

The transistors 12 and 123 of the regulating means 115 can be conveniently referred to as first and second transistors.

FIG. 3 of the drawings shows transistorized regulating means 140 which is generally similar to the regulating means 115 of FIG. 2 and is applied to an alternating current generating system 141 which is substantially the same as the above-described alternating current generating system 116 of FIG. 2. The regulating means 140 differs from the above-described regulating means 115 in that it employs a novel current sensing device 142 in addition to the voltage sensing device 117.

The current sensing device 142 comprises a series resistor 143 located in the load conductor 102 and a transistor 144, conveniently referred to as a third transistor, which is used as both a switching transistor and an amplifying transistor. The current sensing device 142 also comprises a diode 145 of a relatively low breakdown voltage and a pair of diodes operating as half-wave rectifiers 146 and 147.

The transistor 144 is of a conventional form having emitter and collector electrodes 148 and 149 and a base electrode 150. The series resistor 143 is a center tapped resistor having a center tap 152 to which the base 150 of the transistor 144 is connected through the diode 145. The rectifiers 146 and 147 are connected with the load conductor 102 on opposite sides of the series resistor 143 by conductors 153 and 154. The emitter electrode 148 of the transistor 144 is connected with the rectifiers 146 and 147 at a point therebetween by being connected to a junction conductor 155 extending between the rectifiers. The collector electrode 149 of the transistor 144 is connected with the same end of the voltage relay coil 27 as the voltage sensing means 117, through a portion of the common conductor 138 and through a circuit connection 156.

From the construction and circuit connections above described for the current sensing device 142, it will be seen that this device will supplement and co-operate with the voltage sensing device 117 for energizing the voltage relay coil 27 in accordance with current and voltage variations in the output of the alternator 93. It will also be seen that the current sensing device 142 will be responsive to current variations of a relatively low value occurring in the load circuit inasmuch as the diode 145 has a relatively low breakdown voltage and will become conductive to apply a current signal to the base 150 of the transistor 144 whenever the current variation in the load circuit exceeds a predetermined value represented by a predetermined increase in the IR drop across the series resistor 143.

Thus whenever the diode 145 becomes conductive and supplies a current signal to the base 150, the transistor 144 will be switched to a conducting or on condition during which it will cause current to be supplied to the voltage relay coil 27 and, by reason of the use of the pair of half-wave rectifiers 146 and 147, the energizing current thus supplied to the voltage relay coil will be a continuous rectified D.C. current resulting from the rectification of both half-waves of alternating current of the load circuit. By reason of the switching action of the transistor 144, the current supplied to the voltage relay coil will be of a maximum value when a current signal is supplied to the base 150 through the diode 145 and will be of a zero value when the transistor is in its off condition. By reason of the amplifying use of the transistor 144, the current thus supplied to the voltage relay coil 27 while the transistor is in its on condition will be an amplified current.

From the accompanying drawings and the foregoing detailed description it will now be readily understood that this invention provides a novel and highly effective form of regulating means for application to an alternating current supply means and which utilizes the desirable long-life characteristic of a transistor means and the desirable low-cost characteristic of voltage and current relays of the electromagnetic type. It will also be understood that the invention provides novel electrical generating systems employing such a combination transistor-and-relay type of regulating means. Additionally it will be seen that this invention achieves the important advantage from such a combination type of regulating means that the transistor controlling the variable energization of a magnet coil or field winding of the current supply means or alternator, as the case may be, will have a long life and will need to be of a load rating only sufficient for handling the energizing current of such magnet coil or field winding rather than the load current of the load circuit, and also the advantage that this transistor will function as a true switching transistor having an on or off condition depending upon whether control or signal current is being supplied to the base thereof by the voltage and current relays. It will be seen furthermore that another important advantage is realized in that the contacts of the low-cost voltage and current relays will need to handle only the signal current being supplied to the base of the transistor, with the result that the relay contacts will not be subjected to any destructive amount of sparking and will consequently have a long life and will remain in an efficient operating condition.

Although the novel regulating means of this invention and the novel electrical systems embodying the same have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. An electric generating system comprising; an alternator having field means and load terminals; a direct current supply means having output terminals; load circuit means connected with said load terminals; said field means comprising a field winding and field circuit means connecting the field winding with said output terminals; relay-type regulator means comprising coil means connected with said load circuit means to be energized thereby and vibratory contact means responsive to the energization of said coil means; a transistor having main electrodes in said field circuit means for controlling energization of said field winding and a control electrode; additional circuit means connecting said control electrode with said output terminals through said vibratory contact means; said contact means comprising a pair of contact members connected by said additional circuit means with respective ones of said output terminals and a vibratory contact connected with said control electrode by said additional circuit means and disposed between and co-operable with said pair of contact members.

2. An electric generating system comprising; an alternator having field means and load terminals; an exciter having a field winding and also having output terminals connected with said field means; a load circuit connected with said load terminals; a field circuit for said field winding; relay-type regulator means comprising magnet coil means connected with said load circuit to be energized thereby and vibratory contact means responsive to the energization of said magnet coil means; and a transistor having main electrodes in said field circuit in series with said field winding and a control electrode; additional circuit means connecting said control electrode with said output terminals through said vibratory contact means; said contact means comprising a pair of contact members connected by said additional circuit means with respective ones of said output terminals and a vibratory contact disposed between and co-operable with said pair of contact members.

3. An electric generating system comprising; an alternator having field means and load terminals; load circuit means connected with said load terminals; said field means comprising a field winding, and field circuit means connected therewith including a direct current supply means; relay-type regulator means comprising magnet coil means and vibratory contact means responsive to the energization of said magnet coil means; energizing circuit means for said magnet coil means; a first transistor having main electrodes in said field circuit means and a first control electrode for controlling the current between said main electrodes; a circuit for providing an input current to said transistor; means connecting said contact means to said circuit and to said control electrode to apply an input current to said control electrode and to make and break the input current upon operation of said vibratory contact means; a second transistor having main electrodes in said energizing circuit means and a second control electrode; and means connected to said second control electrode to control energization thereof in dependence upon voltage across said load circuit means.

4. An electric generating system comprising; an alternator having field means and load terminals; load circuit means connected with said load terminals; said first means comprising a field winding and field circuit means connected therewith including a direct current supply means; relay-type regulator means comprising magnet coil means and vibratory contact means responsive to the energization of said magnet coil means; energizing circuit means for said magnet coil means; a first transistor having main electrodes in said field circuit means and a first control electrode for controlling the current between said main electrodes; a circuit for providing an input current to said transistor; means connecting said contact means to said circuit and to said control electrode to apply an input current to said control electrode and to make and break the input current upon operation of said vibratory contact means; a second transistor having main electrodes in said energizing circuit means and a second control electrode; and means connected to said second control electrode to control energization thereof in dependence upon current through said load circuit means.

5. An electric generating system comprising; an alternator having a field means and load terminals; load circuit means connected with said load terminals; said field means comprising a field winding, and field circuit means connected therewith including a direct current supply means; relay-type regulator means comprising magnet coil means and vibratory contact means responsive to the energization of said magnet coil means; energizing circuit means for said magnet coil means; a first transistor having main electrodes in said field circuit means and a first control electrode for controlling the current between said main electrodes; a circuit for providing an input current to said transistor; means connecting said contact means to said circuit and to said control electrode to apply an input current to said control electrode and to make and break the input current upon operation of said vibratory contact means; a second transistor having main electrodes in said energizing circuit means and a second control electrode; a third transistor having main electrodes in said energizing circuit means and a control electrode; and means connected to the control electrodes of said second and third transistors to control energization thereof in dependence upon voltage across and current in said load circuit means.

6. An electric generating system comprising; an alternator having field means and load terminals; an exciter having a field winding and also having output terminals connected with said field means; a load circuit comprising load conductors connected with said load terminals; a field circuit for said field winding; relay-type regulator means comprising magnet coil means and vibratory contact means responsive to the energization of said coil means; first and second resistors connected in circuit with said load conductors and having first and second intermediate taps; a first transistor having main electrodes in said field circuit and a first control electrode for controlling the current between said main electrode; a circuit for providing an input current to said transistor; means connecting said contact means to said circuit and to said control electrode to apply an input current to said control electrode and to make and break the input current upon operation of said vibratory contact means; a second transistor having main electrodes and also having a second control electrode; second circuit means connecting said second control electrode with the intermediate tap of the first resistor; a pair of rectifiers; third circuit means connecting one of the main electrodes of said second transistor to said first resistor on the opposite sides of said tap through respective ones of said rectifiers and energizing circuit means connecting one end of said magnet coil means with the intermediate tap of said second resistor and connecting the other end with said load conductors through said rectifiers and through the main electrodes of said second transistor.

7. An electric generating system as defined in claim 6 wherein said second circuit means includes a diode in said energizing circuit means for connecting said second control electrode with the intermediate tap of said first resistor.

8. An electric generating system comprising; an alternator having field means and load terminals; an exciter having a field winding and also having output terminals connected with said field means; a load circuit comprising load conductors connected with said load terminals; a field circuit for said field winding; relay means comprising magnet coil means and vibratory contact means responsive to the energization of said coil means; a first resistor in series in said load circuit and having a first intermediate tap; a second resistor connected across said load conductors and having a second intermediate tap; a first transistor having main electrodes in said field circuit and a first control electrode; first circuit means connecting said control electrode to said output terminals through said vibratory contact means; a second transistor having main electrodes and a control electrode; second circuit means connecting said second control electrode with the intermediate tap of said first resistor; a pair of rectifiers; third circuit means connecting one of the main electrodes of said second transistor to said resistor on the opposite sides of said tap through respective ones of said rectifiers; and energizing circuit means connecting one end of the said magnet coil means with the intermediate tap of said second resistor and connecting the other end with said load circuit through said rectifiers and through the main electrodes of said second transistor.

9. An electric generating system comprising; an alternator having field means and load terminals; an exciter having a field winding and also having output terminals connected with said field means; a load circuit comprising load conductors connected with said load terminals; a field circuit for said field winding; relay means comprising magnet coil means and vibratory contact means responsive to the energization of said coil means; a first resistor connected in series in said load circuit and having a first intermediate tap; a pair of second and third resistors connected across said load conductors and having second and third intermediate taps; a first transistor having main electrodes in said field circuit and a first control electrode; first circuit means connecting said control electrode with said output terminals through said vibratory contact means; a second transistor having main electrodes and also having a second control electrode; second circuit means connecting said second control electrode with the intermediate tap of said second resistor; a third transistor having main electrodes and also having a third control electrode; third circuit means connecting said third control electrode with the intermediate tap of said first resistor; a first pair of rectifiers; a second pair of rectifiers; fourth circuit means connecting one of the main electrodes of said second transistor to the load circuit on the opposite sides of the intermediate tap of said first resistor through respective ones of said second pair of rectifiers; fifth circuit means respectively connecting one of the main electrodes of said third transistor to said load circuit on the opposite sides of the intermediate tap of said second resistor through respective ones of said second pair of rectifiers; additional circuit means connecting one end of said magnet coil means with the intermediate tap of said third resistor; circuit means connecting the other end of said magnet coil means with said load circuit through the main electrodes of said second transistor and through said first pair of rectifiers; and circuit means connecting said other end of said coil means with said load circuit through the main electrodes of said third transistor and through said second pair of rectifiers.

10. In combination; an alternator including a pair of load terminals and a field winding; a load circuit comprising load conductors connected with said load terminals; a resistor connected across said load conductors and having an intermediate tap; a voltage responsive breakdown device; a pair of rectifiers; a transistor having emitter and collector electrodes and also having a control electrode; first circuit means connecting said control electrode with the intermediate tap of said resistor through said breakdown device; circuit means connecting said emitter electrode with said load conductors on the opposite sides of said tap through respective ones of said rectifiers; and a relay having a coil and contacts responsive to energization of the relay coil; second circuit means connected to said coil for supplying a field current to said coil; and means connecting said contacts into said second circuit means to switch field current in said coil on and off in response to the operation of said contacts to control energization of said field winding; said coil having one end connected with said load circuit and the other end connected with said collector electrode.

11. In combination; an alternator including a pair of load terminals and a field winding; a first resistor in circuit with said load terminals and having a first intermediate tap; a second resistor in circuit with said load terminals and having a second intermediate tap; a voltage responsive breakdown device; a pair of rectifiers; a transistor having emitter and collector electrodes and also having a control electrode; first circuit means connecting said control electrode with the intermediate tap of said second resistor through said breakdown device; circuit means connecting said emitter electrode with said load terminals on the opposite sides of said second intermediate tap through respective ones of said rectifiers; and a relay having a coil, and contacts responsive to energization of the relay coil; a field circuit connected to said field winding for energizing said field winding with a field current; and means connecting said contacts to said field circuit to effectively switch current in said field winding on and off in response to the operation of said contacts; said coil having one end thereof connected with the intermediate tap of said first resistor and its other end connected with said collector electrode.

12. In combination; an alternator including a pair of load terminals and a field winding; a load circuit comprising load conductors connected with said load terminals; a first resistor connected across said load conductors and having a first intermediate tap; another resistor in series in said load circuit and having a second intermediate tap; a voltage responsive breakdown device; a pair of rectifiers; a transistor having emitter and collector electrodes and also having a control electrode; first circuit means connecting said control electrode with the intermediate tap of said another resistor through said break- down device; a relay having a coil, and contacts responsive to energization of the relay coil; a field circuit connected to said field winding for energizing the field winding with a field current; means connecting said contacts to said field circuit to effectively switch field current in said winding on and off in response to the operation of said contacts; said coil having one end thereof connected with the intermediate tap of said first resistor and its other end connected with said collector electrode; and circuit means connecting said emitter electrode to said another resistor on the opposite sides of said second intermediate tap through respective ones of said rectifiers for energizing said emitter electrode through said rectifiers and in accordance with the voltage drop across said another resistor.

13. In combination; an alternator including a pair of load terminals and a field winding; a load circuit comprising load conductors connected with said load terminals; a series resistor in one of said load conductors and having an intermediate tap; a voltage responsive breakdown device; a pair of rectifiers; a transistor having emitter and collector electrodes and also having a control electrode; first circuit means connecting said control electrode with the intermediate tap of said resistor through said breakdown device; circuit means connecting said emitter electrode with said one load conductor on opposite sides of said resistor and through said rectifiers; and a relay having a coil, and contacts responsive to energization of the relay coil; a field circuit connected to said field winding for energizing said field with a field current; means connecting said contacts to said field circuit to effectively switch field current therein on and off in response to the operation of said contacts; said coil having one end connected with said load circuit and the other end connected with said collector electrode.

References Cited by the Examiner
UNITED STATES PATENTS

| 2,740,086 | 3/1956 | Evans et al. | 322—25 |
| 2,866,944 | 12/1958 | Zelina | 322—25 |

LLOYD McCOLLUM, *Primary Examiner.*